United States Patent
Rácz et al.

(10) Patent No.: US 8,619,573 B2
(45) Date of Patent: Dec. 31, 2013

(54) DELAYED FLOW CONTROL ACTION IN TRANSPORT NETWORK LAYER WCDMA COMMUNICATIONS

(75) Inventors: Sándor Rácz, Cegléd (HU); Szilveszter Nádas, Budapest (HU); Pál Pályi, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 679 days.

(21) Appl. No.: 12/730,752

(22) Filed: Mar. 24, 2010

(65) Prior Publication Data
US 2011/0235519 A1 Sep. 29, 2011

(51) Int. Cl.
H04L 12/26 (2006.01)
H04W 28/02 (2009.01)
H04W 28/12 (2009.01)
H04J 1/16 (2006.01)

(52) U.S. Cl.
USPC ........... 370/235; 370/236; 370/232; 370/252; 370/338; 455/450; 709/235

(58) Field of Classification Search
USPC ................. 370/229–234, 235, 328, 331, 338; 709/234–235
See application file for complete search history.

(56) References Cited

U.S. PATENT DOCUMENTS

| | | | |
|---|---|---|---|
| 6,728,211 B1 * | 4/2004 | Peris et al. | 370/235 |
| 6,826,147 B1 | 11/2004 | Nandy et al. | |
| 6,889,050 B1 * | 5/2005 | Willars et al. | 455/452.2 |
| 7,295,516 B1 | 11/2007 | Ye | |
| 8,000,242 B2 * | 8/2011 | Wang et al. | 370/235 |
| 8,125,967 B1 * | 2/2012 | Talley et al. | 370/338 |
| 2002/0186657 A1 * | 12/2002 | Jain et al. | 370/235 |
| 2004/0052212 A1 | 3/2004 | Baillargeon | |
| 2006/0092845 A1 | 5/2006 | Kwan et al. | |
| 2006/0126509 A1 * | 6/2006 | Abi-Nassif et al. | 370/235 |

(Continued)

FOREIGN PATENT DOCUMENTS

| | | |
|---|---|---|
| EP | 0 955 749 | 11/1999 |
| EP | 1926257 A1 | 5/2008 |

(Continued)

OTHER PUBLICATIONS

Notification of Transmittal of International Search Report and Written Opinion mailed Apr. 13, 2011 in corresponding Application No. PCT/SE2011/050224.

(Continued)

*Primary Examiner* — Candal Elpenord
(74) *Attorney, Agent, or Firm* — Nixon & Vanderhye P.C.

(57) ABSTRACT

Congestion is detected in a radio access transport network that includes radio network controllers and base stations. Data packet flows associated with mobile radio communications are controlled in the radio access transport network by a corresponding flow control entity. Each flow is monitored for congestion in the transport network. A flow control action is determined in response to the detected congestion. Performance of the flow control action is delayed for a predetermined delay period before the flow control action may be performed. Delaying flow control action after congestion is detected allows other affected flows to detect or be notified of the congestion, thereby making congestion detection more fair.

22 Claims, 11 Drawing Sheets

(56) References Cited

U.S. PATENT DOCUMENTS

| | | | |
|---|---|---|---|
| 2006/0159016 A1* | 7/2006 | Sagfors et al. | 370/230 |
| 2007/0286132 A1* | 12/2007 | Vikberg et al. | 370/338 |
| 2008/0008093 A1* | 1/2008 | Wang et al. | 370/235 |
| 2009/0161545 A1* | 6/2009 | Ho et al. | 370/235 |
| 2009/0219815 A1* | 9/2009 | Insler et al. | 370/235 |
| 2010/0067383 A1* | 3/2010 | Nagy et al. | 370/236 |

FOREIGN PATENT DOCUMENTS

| | | | |
|---|---|---|---|
| WO | WO 2008066427 A1 * | 6/2008 | |
| WO | WO 2008066430 A1 * | 6/2008 | |
| WO | WO 2009/155031 | 12/2009 | |

OTHER PUBLICATIONS

International Search Report mailed Apr. 13, 2011 in corresponding Application No. PCT/SE2011/050224.

Written Opinion of the International Searching Authority mailed Apr. 13, 2011 in corresponding Application No. PCT/SE2011/050224.

U.S. Appl. No. 12/730,702, filed Mar. 24, 2010, Inventor: Raez et al.

Nádas et al., HSUPA Transport Network Congestion Control, $4^{th}$ IEEE Broadband wireless access workshop, Dec. 2008, pp. 1-6.

Nádas et al., Providing Congestion Control in the Iub Transport Network for HSDPA, Globecom 2007, pp. 5291-5297.

Nádas et al., HSUPA Transport Network Congestion Control, EURASIP Journal on Wireless Communications and Networking, vol. 2009, Article ID 924096, pp. 1-10.

Pályi et al., Fairness-Optimal Initial Shaping Rate for HSDPA Transport Network Congestion Control, $11^{th}$ IEEE International Conference on Communication Systems 2008, Nov. 2008, pp. 1415-1421.

International Search Report issued for PCT Application No. PCT/SE2011/050228, dated May 2, 2011.

Written Opinion of the International Searching Authority issued for PCT Application No. PCT/SE2011/050228, dated May 2, 2011.

* cited by examiner

DELAYED FLOW CONTROL ACTION IN TRANSPORT NETWORK LAYER WCDMA COMMUNICATIONS

RELATED APPLICATION

This application is related to commonly-assigned U.S. patent application Ser. No. 12/730,702, entitled "Fair Congestion Detection For Transport Network Layer WCDMA Communications," filed on Mar. 24, 2010, the contents of which are incorporated herein by reference.

TECHNICAL FIELD

The technical field relates to radio communications systems, and more particularly, to detecting congestion in a radio access transport network.

BACKGROUND

The introduction of High Speed Packet Access (HSPA) greatly improves the achievable bit rate over the air interface, but it presents challenges to be solved in the Wideband Code Division Multiple Access (WCDMA) radio access network (RAN), which is a transport network. FIG. 1 illustrates a WCDMA network 10 with one or more user equipments (UEs) 12 communicating with a WCDMA radio access network (WCDMA RAN) over a Uu air interface, and one or more core networks 18 communicate with radio network controllers (RNCs) 16 in the WCDMA RAN over an Iu interface. WCDMA RAN is also called Universal Mobile Telecommunications System (UMTS) Terrestrial Radio Access Network (UTRAN). The WCDMA RAN handles all tasks that relate to radio access control such as radio resource management and handover control. The core network connects the access network to one or more external networks (PSTN, Internet, etc.). The user equipment (sometimes called a Mobile Terminal or Mobile Station) 12 is connected to one or more radio base stations (Node Bs) 13 over the WCDMA air interface (Uu). One or more base stations are coupled to an RNC 16 over an Iub interface, and the RNCs communicate over an Iur interface. During soft handover, one UE can communicate with several Node Bs simultaneously.

According to the WCDMA RAN specifications by the 3rd Generation Partnership Project (3GPP), all radio network functions and protocols are separated from the functions and protocols in the transport network layer (TNL). The WCDMA RAN Transport Network transmits data and control information between the Radio Network Controller (RNC) and the Node Bs (Iub interface) or between RNCs (Iur interface). For an active UE connection, there is a single Serving RNC (SRNC) that terminates the user and control plane protocols of that UE. The transport network layer provides data and signaling bearers for the radio network application protocols between RAN nodes and includes transport network control-plane functions for establishing and releasing such bearers when instructed to do so by the radio network layer.

The first release of the 3GPP specification was called Release 99. FIG. 2 shows the Release 99 protocol stack at the Iub interface for transferring data streams on common transport channels (CCH) and dedicated transport channels (DCH) to the air interface. The acknowledged retransmission mechanism of the radio link control (RLC) protocol ensures reliable transmission of loss-sensitive traffic over the air interface. RLC provides three types of service to the upper layers: transparent (no additional protocol information), unacknowledged (delivery not guaranteed), and acknowledged data transfer mode. The normal RLC mode for packet-type services is the acknowledged mode, so RLC works in this mode in case of HSPA as well. The RLC protocol is used by both signaling radio bearers and radio bearers for packet-switched data services, but not by radio bearers for circuit-switched services. RLC Acknowledged Mode (AM), which is a Selective Repeat Automatic Repeat-request (SR-ARQ) protocol, provides transport service to upper layers between UE and the RNC. RLC AM does not include congestion control functionality because it assumes that RLC Protocol Data Units (PDUs) are transmitted by the Medium Access Control—dedicated (MAC-d) layer according to the available capacity allocated on the air interface Uu and the Transport Network. RLC status messages are sent regularly based on preset events and trigger retransmission of all missing PDUs. The receiver side detects missing RLC PDUs based on gaps in the PDU sequence numbers. The receiver side RLC requests retransmission by sending back a status PDU, informing which PDUs within the receiving window have been acknowledged (ACK) or lost (negative ACK, NACK). Upon reception of a status message, the sender can slide its transmission window (Tx window) if one or more in-sequence frames are acknowledged, so that new PDUs can be sent. If there are NACKs in the status message, the sender retransmits the missing PDUs giving them priority over new ones. Several unsuccessful retransmissions of the same PDU trigger an RLC reset, and the whole RLC Tx window is discarded.

FIG. 2 shows a user plane protocol stack between the RNC and Node B for Release 99. The MAC-d protocol forms sets of transport blocks in the air interface and schedules them according to the timing requirements of WCDMA. Each scheduled period, called a transmission time interval (TTI), is 10 ms in length or multiples thereof. Release 99 WCDMA radio connections, or radio access bearers (RAB), have practical bit rate values between 8 and 384 kbps. The size of the MAC transport blocks and length of the TTI are RAB-specific. For data transfer over the Iub interface, the MAC transport blocks are encapsulated into Iub frames according to the Iub user-plane (UP) protocol for CCH or DCH data streams. Each Iub user-plane data stream needs a separate transport network connection between the RNC and Node B. The transport network thus establishes one transport network layer connection for each data stream. In FIG. 2, an optional TNL switch may used for building/aggregating transport networks.

In response to the increased need for higher bit rate and more efficient transmission of packet data over cellular networks, the WCDMA 3GPP Release 5 extended the WCDMA specification with the High Speed Downlink Packet Access (HSDPA), and Release 6 introduced Enhanced Dedicated Channel (E-DCH), often referred as Enhanced Uplink (EUL) or High Speed Uplink Packet Access (HSUPA). HSDPA and HSUPA together are called HSPA. In HSPA, certain parts of radio resource control are moved from the RNC to the Node Bs. In 3GPP Release 7, higher-order modulation and multiple input multiple output (MIMO) are introduced for HSDPA to further improve the achievable bit rate.

Although transport network bandwidth can be reserved using admission control for Dedicated Channels (DCHs) traffic in the access transport network, individual data packet "flow" bandwidth reservation is not efficient for HSPA because air interface throughput is much higher and fluctuates more. The term "flow" corresponds to a logical connection in the radio access transport network that carries data packets associated with a UE connection. Packets associated with a flow are carried using one or more communications channels on a physical link connecting nodes in the transport network. Because bandwidth reservation is not used, congestion may occur in both the Iub transport network and over the air interface. Congestion occurs when the available communications capacity is exceeded by the sum of the current data packet flow rates.

In the current WCDMA architecture, the TCP protocol layer in the UE and in the uplink server cannot efficiently resolve a congestion situation in the radio access network because RLC AM retransmissions between the RNC and the UE hide congestion situations from TCP. Congestion is particularly a problem given the increased air interface capacity provided by HSPA. That increased air interface capacity does not necessarily mean there is increased Iub transport network capacity. Network operators often upgrade the Node Bs first and delay the upgrade of the transport network until there is significant HSPA traffic. In some cases, the cost of Iub transport links is still high, and thus, it is a common scenario that throughput is limited by the capacity available on the Iub transport network links and not by the capacity of the air interface. For example, a typical scenario is that the Node B is connected to the RNC through an E1 link of capacity about 2 Mbps, and the available Uu capacity for HSDPA can be significantly larger that this 2 Mbps. So a single UE given good radio conditions can overload the radio transport network (TN). "Bottleneck" transport network links or nodes can therefore be a serious problem.

TCP "slow start" normally quickly increases a TCP congestion window size to its maximum, and it is kept at that value. Due to RLC retransmissions, TCP does not experience packet loss. In case of transport network congestion, the RLC layer keeps retransmitting lost PDUs until they are successfully received (or until RLC resets). Unfortunately, these retransmissions increase the congestion level, and TCP is only notified about the transport network congestion at a significantly later time. Accordingly, because the RLC layer does not have congestion control functionality and TCP congestion control does not operate efficiently in the transport network, HSPA data packet flow control is necessary. Although fair sharing of radio resources over the Uu air interface is the task of the Uu scheduler in the Node B, the Uu scheduler can not solve the bottleneck problem in the transport network.

To deal with this transport network bottleneck problem, a flow control (FC) mechanism may be introduced in the RNC and/or Node B to regulate each data packet flow. An important goal for transport network flow congestion detection and control is to fairly allocate the transport network communication resources (e.g., bit rate) to ongoing data packet flows based on the available link capacity in the transport network. But the fairness of HSPA flow control depends on the fairness of transport network congestion detection. For example, an Additive Increase Multiplicative Decrease (AIMD) type congestion control procedure requires synchronous congestion signals for fair bandwidth sharing. Synchronous congestion signals means that when a transport network link is congested, all the flows using that link need to detect or otherwise be aware of the transport network congestion situation. But if a first group of data packet flows detects transport network congestion on a particular link and a second group of flows using that same link do not, then the bit rate of the two groups of will differ significantly. The "lucky" flows that do not detect congestion will have higher bit rates and a larger bandwidth share than the unlucky flows. This bandwidth disparity between flows is caused by unfair or inadequate transport network congestion detection.

SUMMARY

Congestion is detected in a radio access transport network that includes one or more radio network controllers each coupled to one or more radio base stations. Multiple data packet flows are each associated with a mobile radio terminal communication, and each flow is controlled in the radio access transport network by a corresponding flow control entity. Each flow is monitored for congestion in the transport network. A flow control action is determined in response to detected congestion. Performance of the flow control action is delayed for a predetermined delay period before the flow control action may be performed. Delaying flow control action after congestion is detected for that flow allows other affected flows to detect or be notified of the congestion, thereby making congestion detection more fair.

In a non-limiting example embodiment, a flow control action message, e.g., decrease the bit rate of a flow affected by the congestion bottleneck, is generated in response to the detected congestion, but it is not sent immediately. Instead, transmission of the generated flow control action message is delayed for a predetermined delay period. After waiting the predetermined delay period, the generated flow control action message is then sent so that one or more of the flow control entities may take a flow control action based on the detected congestion. Alternatively, a flow control action message may be generated in response to the detected congestion and sent. The receiving entity then waits the predetermined delay period after the generated flow control action message is received before performing a flow control action in response to the flow control action message.

The detected congestion area may be for example a shared congested communications link in the radio access transport network, a shared congested radio network controller, or a shared congested radio base station.

In a non-limiting example embodiment, delaying performance of the flow control action for the predetermined delay period occurs whenever congestion is detected in the radio access transport network. In another example embodiment, delaying performance of the flow control action for the predetermined delay period occurs only for some but not all of the times when congestion is detected in the radio access transport network In another example embodiment, delaying performance of the flow control action for the predetermined delay period occurs only if the detected congestion is a predetermined type of congestion. In another example embodiment, delaying performance of the flow control action for the predetermined delay period occurs only if the monitored data packet flow is associated with a particular service class.

The predetermined delay period may include different predetermined delay period values. For example, the predetermined delay period may include a first delay associated with detecting a soft type of congestion and a second, shorter delay associated with detecting a hard type of congestion.

In a non-limiting example embodiment, a maximum delay value actually waited in a recent prior time interval may be determined. If the maximum delay value exceeds the predetermined delay period, then the flow control action is performed or a flow control action message is sent without waiting predetermined delay period.

The detected congestion may be in a downlink direction from radio network controller to radio base station or in an uplink direction from radio base station to radio network controller. The congestion detection and notification may be performed in a radio base station, e.g., in the downlink, or in a radio network controller, e.g., in the uplink.

DETAILED DESCRIPTION

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Figure 1:
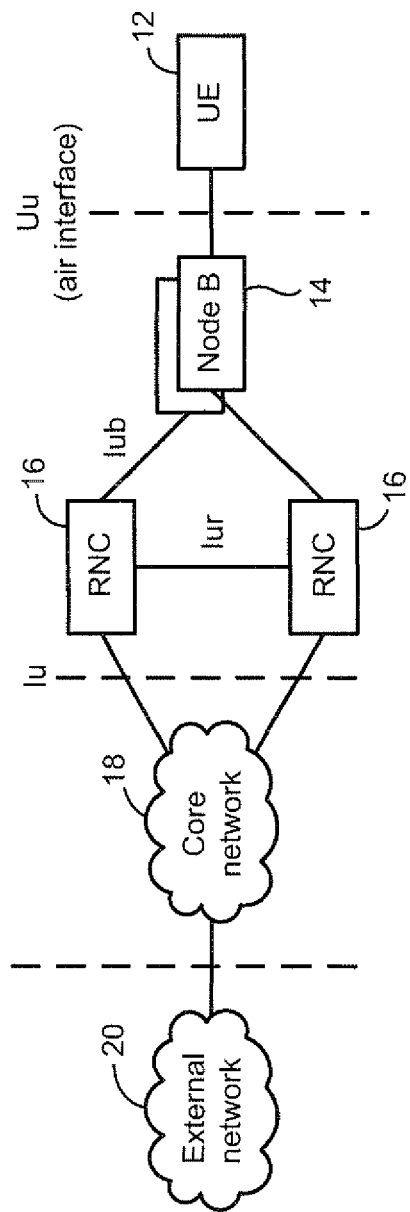
FIG. 1 illustrates an example WCDMA cellular communications system.
Figure 2:
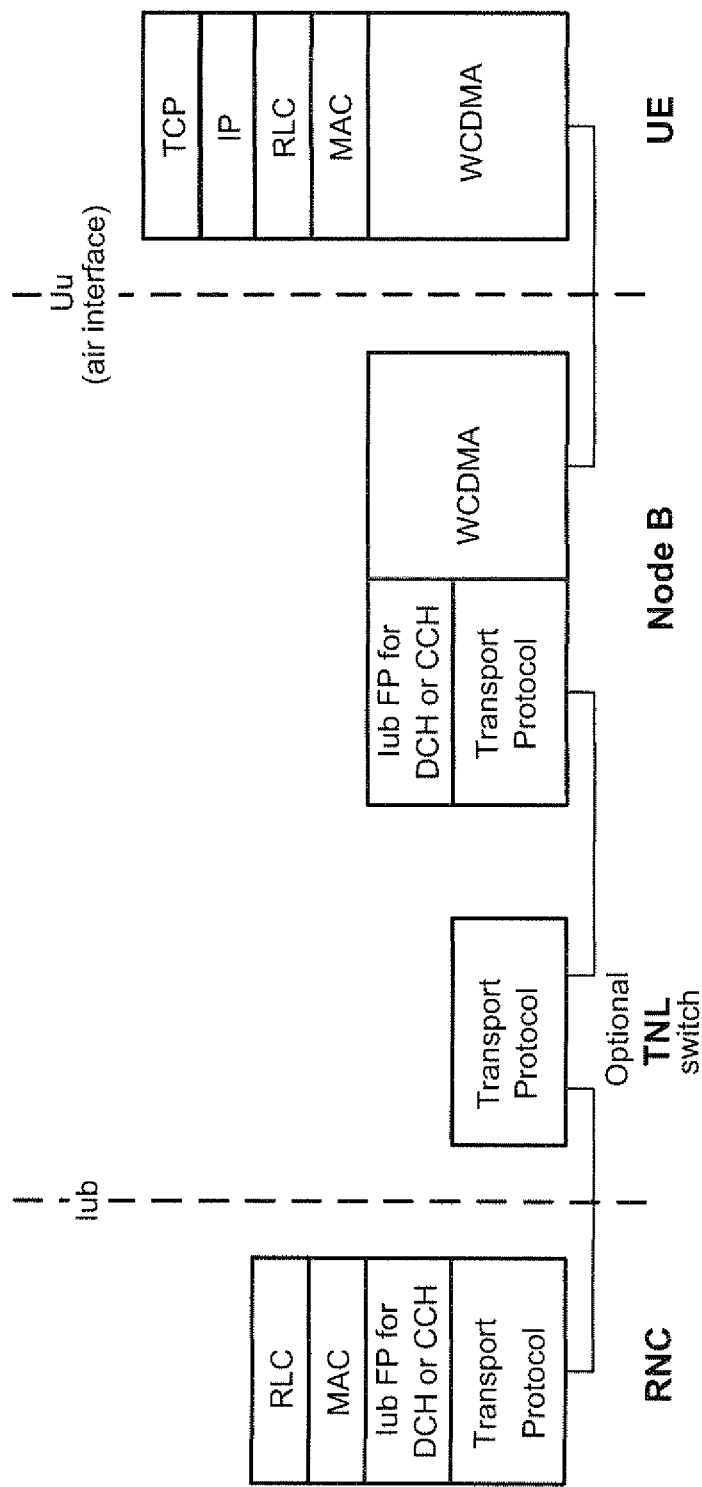
FIG. 2 illustrates an example protocol stack.

The technology may be used in any type of cellular radio communications. For ease of description, the term mobile radio terminal encompasses any kind of radio communications terminal/device like user equipment (UE), PDAs, cell phones, laptops, etc. The data packet flow control technology described in this application may be used for example in a WCDMA based communications system 10 in FIG. 1 described above. But those skilled in the art will appreciate that the technology may be used in any radio access transport network where congestion detection and control are useful.

Figure 3:
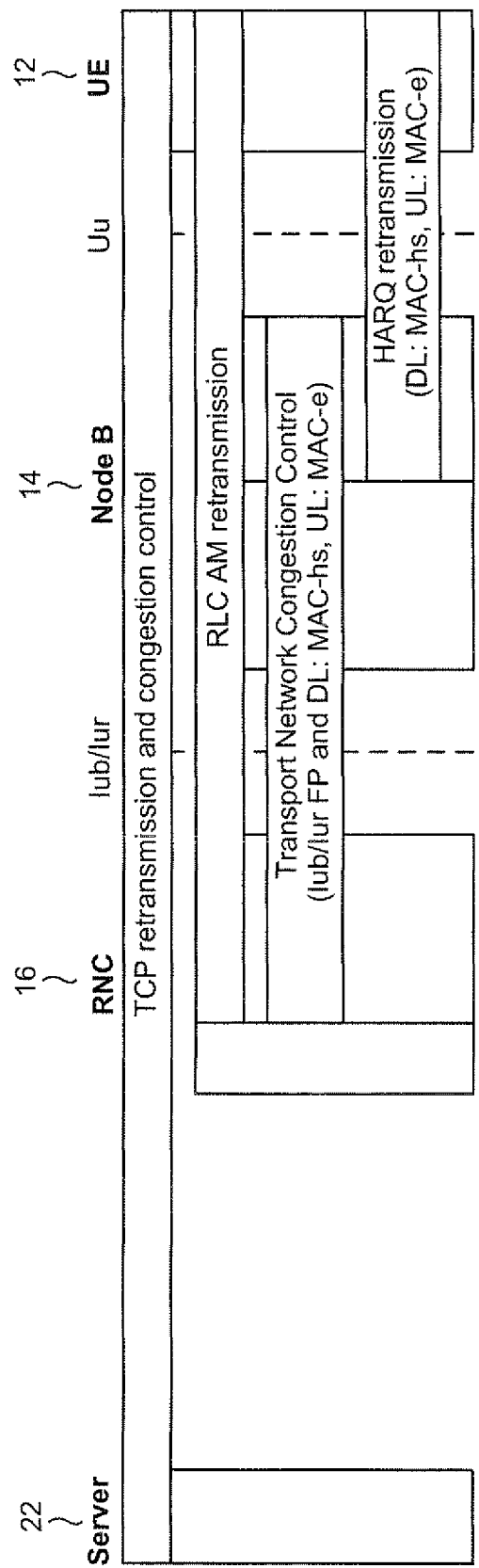
FIG. 3 illustrates an example of protocol layers for performing congestion control and/or retransmission.

FIG. 3 illustrates protocol layers performing congestion control and/or retransmission in the WCDMA network example. As explained in the background, TCP retransmission and congestion control is not effective in detecting and fairly implementing congestion control in the transport network. Therefore, transport network congestion detection and control is implemented, e.g., in the RNC and Node B.

Figure 4:
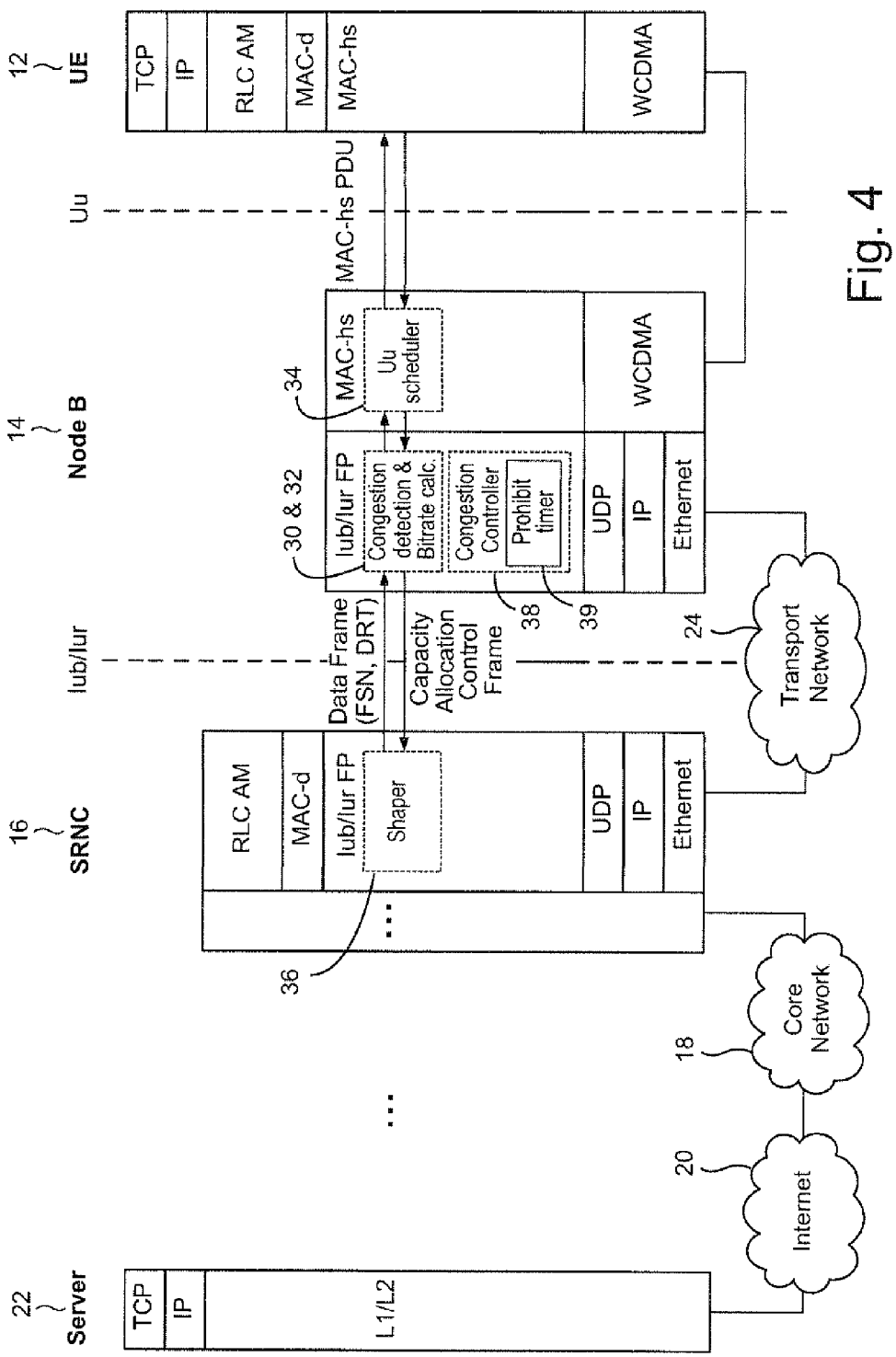
FIG. 4 illustrates an example HSDPA protocol stack and flow control architecture.

FIG. 4 shows an example HSPDA protocol stack and flow control architecture that can be used in this non-limiting WCDMA network example. Here, a server 22 communicates at the TCP layer with the UE 12 via the internet 20, a core network 18, a serving RNC 16, and a Node B radio base station 14 over corresponding interfaces. Each flow-controlled flow has a corresponding logical flow controller implemented in functionality of the Node B and RNC serving that flow. (There may be other flows that are not flow-controlled in the transport network). In the non-limiting examples below, each data packet flow controller is implemented using congestion detection functionality, maximum allowed transport network bit rate determination functionality, and flow shaping functionality for implementing/enforcing that maximum allowed transport network bit rate. While the following description distributes these flow control functionalities to particular nodes and protocol layers for illustration purposes only, the flow control functionalities may be implemented centrally, in some other distribution, or in any other suitable manner.

On the Iub side of the Node B 14 protocol stack, circuitry in the Node B performs congestion detection 30 and bit rate calculation 32 for each of multiple data packet flows at the frame protocol (FP) layer. The congestion detection functionality 30 receives packets with frame sequence numbers (FSNs) and delay reference times (DRTs) from the RNC 16. The Iub/Iur Framing Protocol E-DCH data frame (DF) contains the user data, the Frame Sequence Number (FSN), the Connection Frame Number (CFN), and Subframe Number. FSN and DRT can be used for transport network congestion detection. The DRT field contains the value of a DRT reference counter corresponding to when the data frame was sent. The DRT counter may be increased for example every 1 ms.

The congestion detection 30 function analyzes packets for its data packet flow from the RNC and interprets a gap in sequence numbers of arriving packets as "hard" congestion because this gap is likely due to packet loss in the transport network caused by congestion. The congestion detection 30 function also measures the variation of the one-way packet delay between RNC and Node B using a time-stamp, e.g., in a DRT field, in some of the received packets. In on example implementation, if this delay starts to increase, probably due to queue build up in the transport network, the condition may be interpreted as "soft" congestion. But if this delay build up is larger than a predetermined threshold, e.g. 60 ms, the condition may be interpreted as "hard" congestion.

The following illustrates an example use of the DRT field. Assume there are two RNCs—RNC-A and RNC-B. Each has its own counter used to provide a time stamp in the DRT field. Assume also each counter is set to zero when started and is incremented every 1 msec. If RNC-B's counter starts 3 seconds after RNC-A's counter, then RNC-B's counter will be zero when RNC-A's counter reaches 3000 msecs. So if both RNC-A and RNC-B send a packet at the same time, e.g., at 6 seconds, RNC-A inserts 6000 into the DRT field for the packet associated with one flow while RNC-B inserts 3000 into the DRT field of a packet associated with another flow. Upon receiving these two packets, the Node B determines there is a significant difference between the two DRT values and correctly concludes that the two packets are coming from different RNCs. The assumption is that flows from the same RNC experience the same or at least similar congestion. So once congestion is detected, the approach described in this paragraph is one example way of determining a group of flows that share the same congestion area.

Another factor that may be used to detect congestion is to detect the length of the Node B packet queue (PQ) for the flow. If the PQ length is too long, e.g., exceeds a threshold, then a congested condition is detected.

A congestion controller 38 in the Node B 14 receives detected congestion information from each congestion detection entity 30 associated with flows detected as congested. The congestion controller 38 identifies from the detected congestion information provided by the other congestion detection entities 30 which other flows share the same transport network bottleneck (a congested transport network link, a congested RNC, etc.). The congestion controller 38 then distributes information concerning the detected congestion to the flow control entities for those identified flows. That way most and preferably all of the flow entities using the congested transport network communications resource (the bottleneck) know about the congestion and can take necessary actions to reduce or avoid the congestion. These flow entities should be unaware of the congestion situation because either they detected the congestion themselves or they were informed of the congestion. The beneficial result is fair congestion detection which can lead to fair sharing of limited resources.

The bit rate calculation functionality 32 determines an appropriate maximum allowable transport network bit rate for its data packet flow. When a new flow arrives, (after a new flow control entity is created), a slow-start like mechanism may be used to discover a suitable starting maximum allowed bit rate for the flow. If transport network congestion is detected by congestion detection entity 30, then it generates a signal to reduce transport network resource use in the congested area, e.g., reduce bit rate of a flow.

In one example embodiment, the bit rate calculation function 32 responds to hard and soft congestion in different ways. The bit rate calculation function 32 calculates the current maximum bit rate allowed by the transport network for each flow. For example, that maximum allowed rate may conform with an Additive Increase Multiplicative Decrease (AIMD) property that guarantees convergence to fairness, i.e., the flows converge to an equal share of resources in steady state, assuming no flows join or leave. A maximum bit rate for each flow is maintained. That maximum bit rate is increased (e.g., linearly, additively, etc.) for a flow if there is no reported congestion from congestion detection function 30 for that flow. But if congestion is reported for a flow, then its maximum bit rate typically will be reduced. The bit rate might be reduced for example by 50% in the case of hard congestion and for example by 10% in the case of soft congestion.

If the calculated maximum allowed transport network bit rate for a flow changes, (e.g., significantly to avoid too many bit rate changes), then a shaper function 36 in the serving RNC 16 may be informed about the new bit rate (or other resource use parameter) through a control frame, e.g., a Capacity Allocation (CA) control frame is shown in FIG. 4. The shaper 36 shapes each data packet flow according to its corresponding signaled maximum allowed flow bit rate. The Iub Framing Protocol (FP) puts them into Iub Data Frames and sends them to the Node B. Each frame contains a Frame Sequence Number (FSN), and some frames contain an absolute value of a Delay Reference Time (DRT). For example, this DRT value may incremented in the RNC every 1 ms.

Various options exist for sending congestion information. One example is for the RNC to send transport congestion information (TCI) for all flows supported by a Node B. When congestion is detected, flows coming from the same Node B are identified based on the DRT values. All flows coming from the same Node B can be informed about congestion using a TCI control frame. Another example option relates to downlink transport network bottlenecks already identified in a Node B. The TCI includes all EUL flows affected by the same bottleneck. When the central congestion controller receives the TCI, then all flows coming from the same RNC may be informed about the congestion. Here, it is assumed that the uplink and downlink paths of the flows are the same, so downlink flow identification may be used.

To further ensure fair congestion detection, flow control action in response to congestion detection is preferably delayed. In the non-limiting example of FIG. 4, transmission of the CA control frame may be delayed for a predetermined time delay. One non-limiting example predetermined time delay might be 100 ms. Any suitable delay value may be used that enables fair congestion detection. During this delay time, the detected buffer levels (a measure of transport network delay) for all congestion-affected flows grow and more loss events occur for those flows, which makes congestion detection by all of the congestion-affected flows more likely, and thus, congestion detection is more fair. For example, if a congestion detection threshold is almost but not yet exceeded, after waiting for the predetermined delay, that threshold will be exceeded for affected flows and therefore detected with a higher probability. Similarly, because other users have a greater chance to detect lost packets during the predetermined delay time, the likelihood of the detecting packet loss increases for congestion-affected flows.

One way of implementing the predetermined delay time is to use a prohibit timer 39 for each congestion-affected flow. An example location for the prohibit timers 39 is in the congestion controller 38 as shown in FIG. 4. The congestion controller 38 starts the prohibit timer 39 when congestion detection 30 detects congestion for a flow. When the prohibit timer 39 indicates that the predetermined delay time has expired, the congestion controller 38 instructs the bit rate calculator 32 for the flow to transmit the CA control frame to the shaper 36 to shape the affected data packet flow according to its corresponding signaled maximum allowed flow bit rate. Alternatively, the prohibit timer 39 may be implemented in the shaper 36 and started when the CA control frame is received. The shaper 36 waits until the timer times out before implementing the signaled maximum allowed flow bit rate. Ultimately, the delayed flow control action may be implemented in any suitable way.

Figure 5:
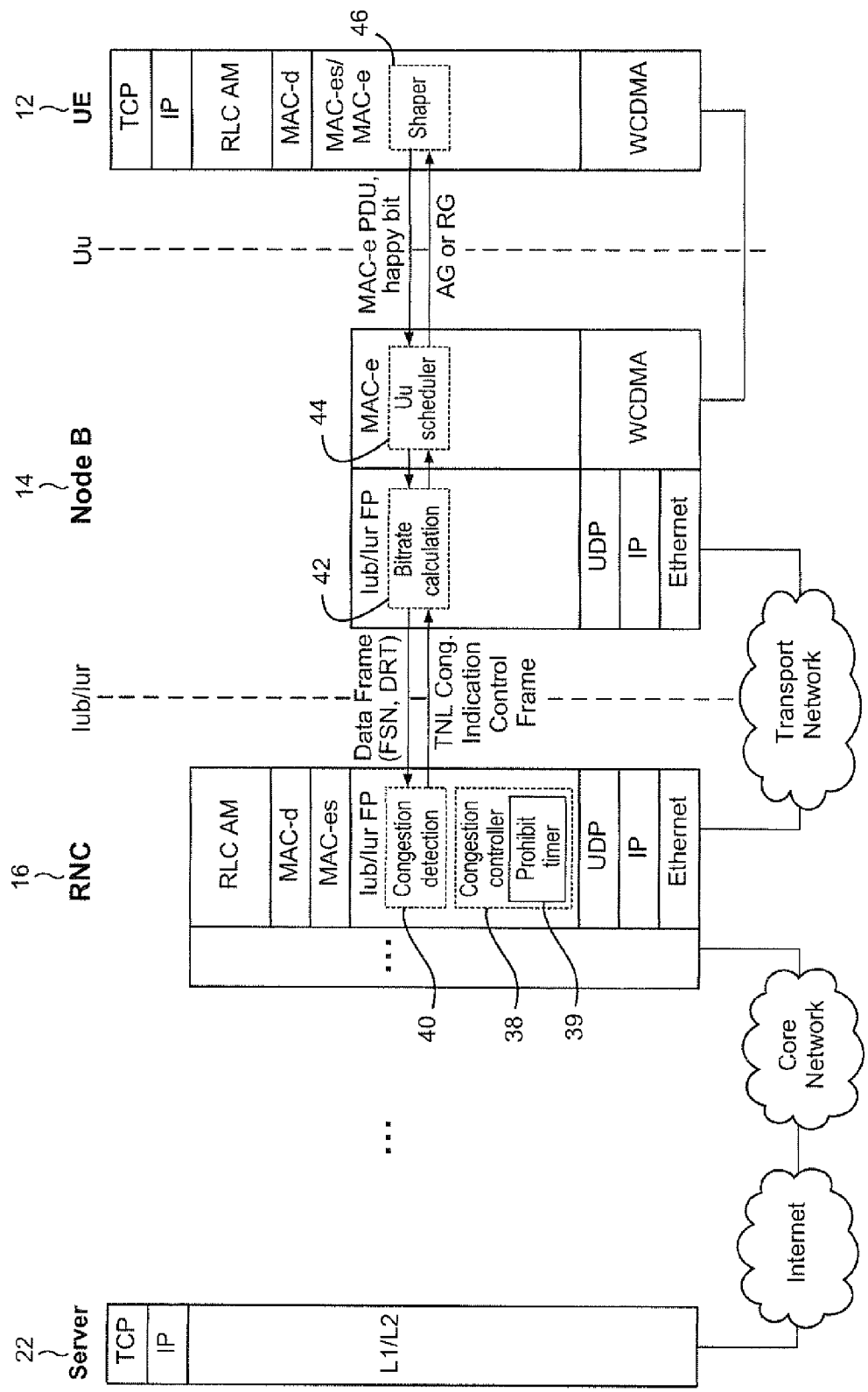
FIG. 5 illustrates an example HSUPA protocol stack and flow control architecture.

FIG. 5 illustrates an example HSUPA protocol stack and flow control architecture that can be used in this non-limiting WCDMA network example. The basic approach used in the downlink direction in FIG. 4 applies in the uplink direction in FIG. 5 except that the congestion detection, bit rate calculation, and shaping functionalities are distributed (in this example) to different nodes. Each flow control congestion detection functionality 40 is implemented in the RNC 16 at the Iub/Iur FP layer. The UE 12 sends MAC-e packets (PDUs) uplink to the Node B which forwards them to the RNC 16. The congestion detection functionality 40 in the RNC 16 receives packets with frame sequence numbers (FSNs) and DRT times from the Node B 14 to determine whether a congestion bottleneck is affecting its corresponding flow. If so, the congestion detection functionality 40 sends a transport network layer (TNL) congestion indication control frame including a maximum bit rate to the bit rate calculation functionality 42 for that flow control in the Node B 14. The new maximum flow bit rate is provided to a Uu scheduler 44 in the Node B 14 and sent on to a shaper 46 in the MAC-es/MAC-e layer of the UE-12. The timing of these messages and actions depends on the flow congestion action delay implementation used.

For example, prohibit timers 39 may be implemented in the congestion controller 38 located in the RNC as shown in FIG. 5. The congestion controller 38 starts the prohibit timer 39 when congestion detection 40 detects congestion for a flow. When the prohibit timer 39 indicates that the predetermined delay time has expired, the congestion controller 38 instructs the flow's congestion detection 40 to transmit the TNL congestion indication control frame to the flow's bit rate calculation 42 which sends it on to the Uu scheduler 44. The Uu scheduler 44 sends the new maximum bit rate for the flow in an absolute grant or relative grant message to the shaper 46 which shapes the data packet flow according to its corresponding signaled maximum allowed flow bit rate. Alternatively, the prohibit timer 39 may be implemented in the shaper 46 and started when the grant message is received. The shaper 36 waits until the timer times out before implementing the signaled maximum allowed flow bit rate. Another example implementation is to have the bit rate calculation 42 or Uu scheduler 44 effect the delay. Any suitable delay implementation may be used.

There are two types of scheduling grants: an absolute Grant (AG) and a relative Grant (RG). An AG is used to signal the maximum transport network allowed bit rate at which the UE may send data to Node B taking into account congestion information from the congestion detection 40. The RG can modify this rate up/down in the serving cell or down in the non-serving cell. The shaper 46 shapes the outgoing MAC-e PDUs according to the is signaled maximum flow bit rate and sends them to the Node B. The MAC-c layer in the Node B demultiplexes MACes PDUs and sends them to the Iub FP layer which puts arriving MAC-es PDUs into Iub data frames and forwards them to the RNC for congestion detection.

Figure 6:
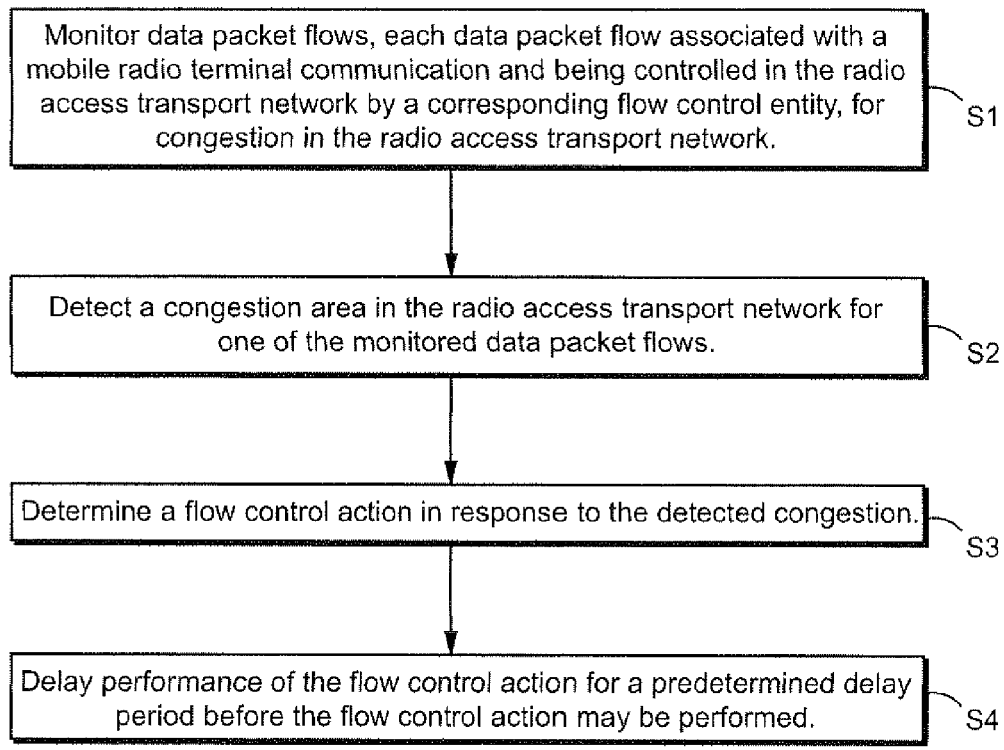
FIG. 6 is a flow chart illustrating non-limiting example procedures for congestion detection and delayed flow control action in a radio access transport network.

FIG. 6 is a flow chart illustrating non-limiting example procedures for congestion detection and notification in a radio access transport network. Multiple data packet flows are each associated with a mobile radio terminal communication, and each flow is controlled in the radio access transport network by a corresponding flow control entity. They are monitored for congestion in the transport network (step S1). If a congestion area in the transport network is detected for one of the monitored data packet flows (step S2), then a flow control action is determined in response to the detected congestion (step S3). The detected congestion area may be for example a shared congested communications link in the radio access transport network, a shared congested radio network controller, or a shared congested radio base station. Performance of the flow control action is delayed for a predetermined delay period before the flow control action may be performed (step S4). Delaying flow control action after congestion is detected allows other affected flows to detect or be notified of the congestion, thereby making congestion detection more fair.

Figure 7:
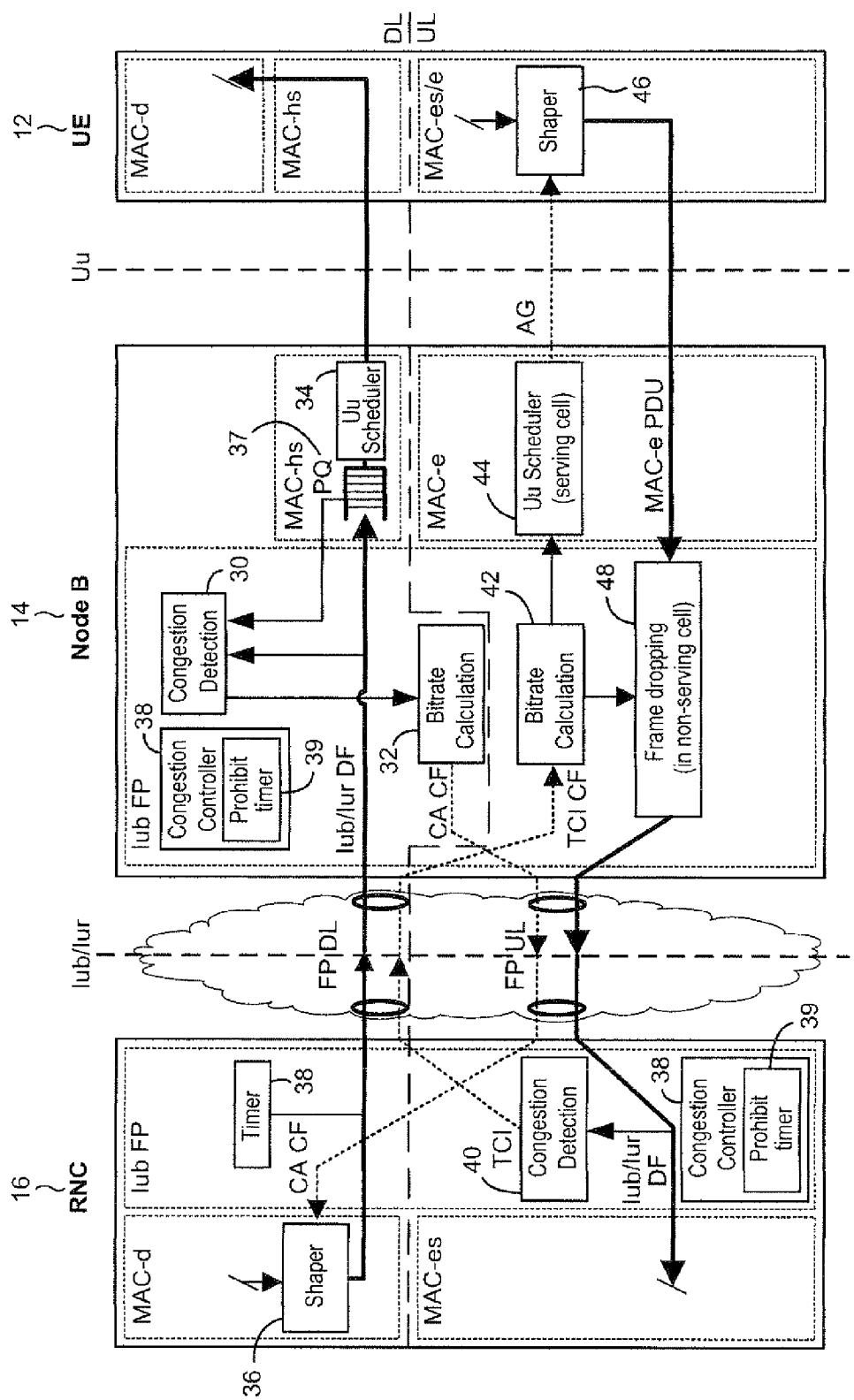
FIG. 7 is a function block diagram illustrating a non-limiting example with both downlink and uplink transport network congestion detection and control.

FIG. 7 shows a non-limiting example implementation with both downlink (DL) and uplink (UL) flow congestion detection, notification, and control. Downlink flow congestion detection, notification, and control are shown in the upper portion of the figure and uplink flow congestion detection, notification, and control in the lower portion. Like reference numerals from FIGS. 4 and 5 are used. In addition, a DRT timer 38 is shown in the RNC and periodically generates time stamp values, e.g., every 1 ms, which are inserted in the downlink data frame Iub/Iur DF sent to the Node B. The Node B also shows a packet queue (PQ) coupled to the Uu scheduler 34 with a line from the PQ 37 to the congestion detection functionality 30 indicating that the queue length is monitored for congestion detection purposes. The congestion controllers 38 in this example include prohibit timers 39 as described above.

Figure 8A:
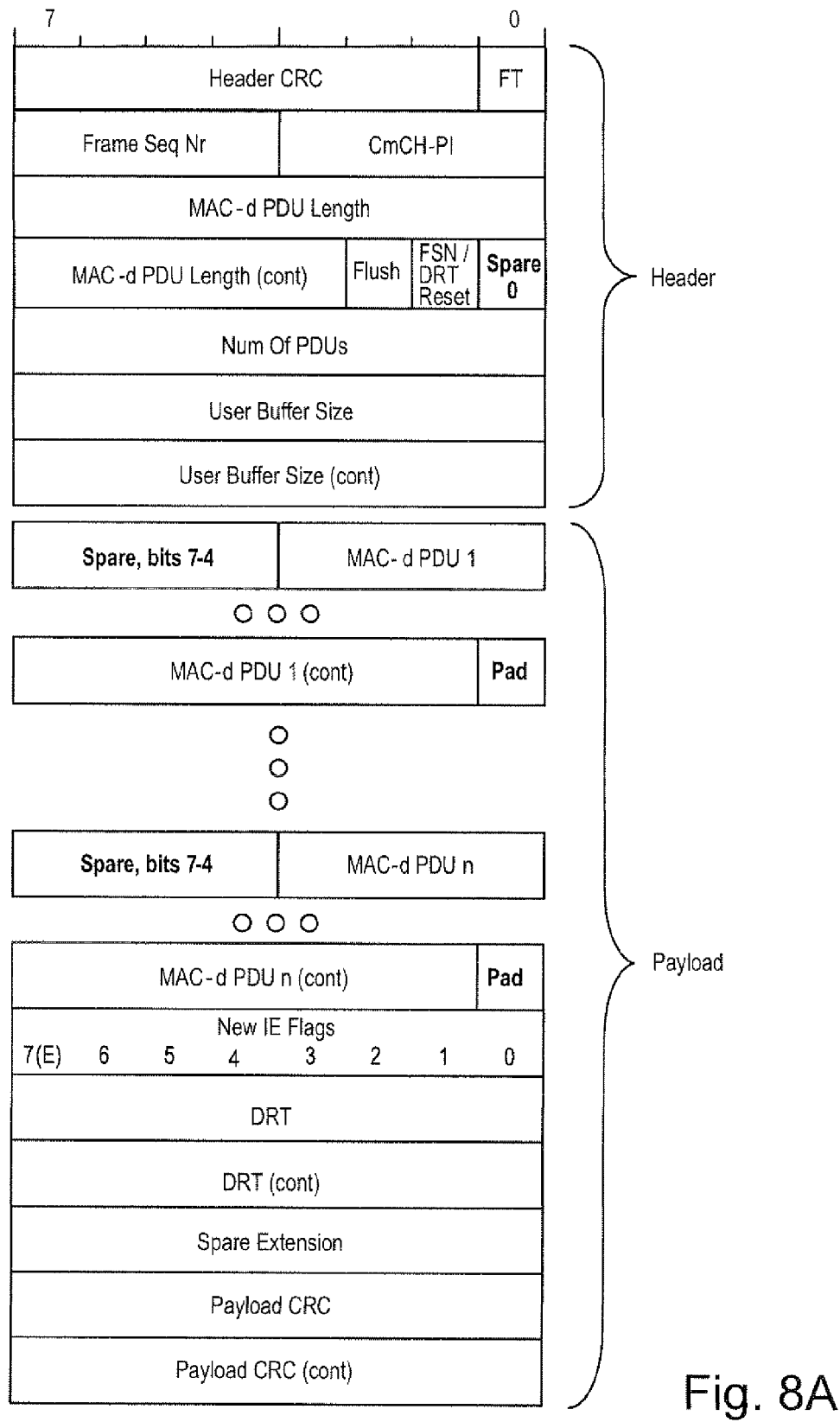
FIGS. 8A and 8B show example HS-DSCH data frame structures.
Figure 8B:
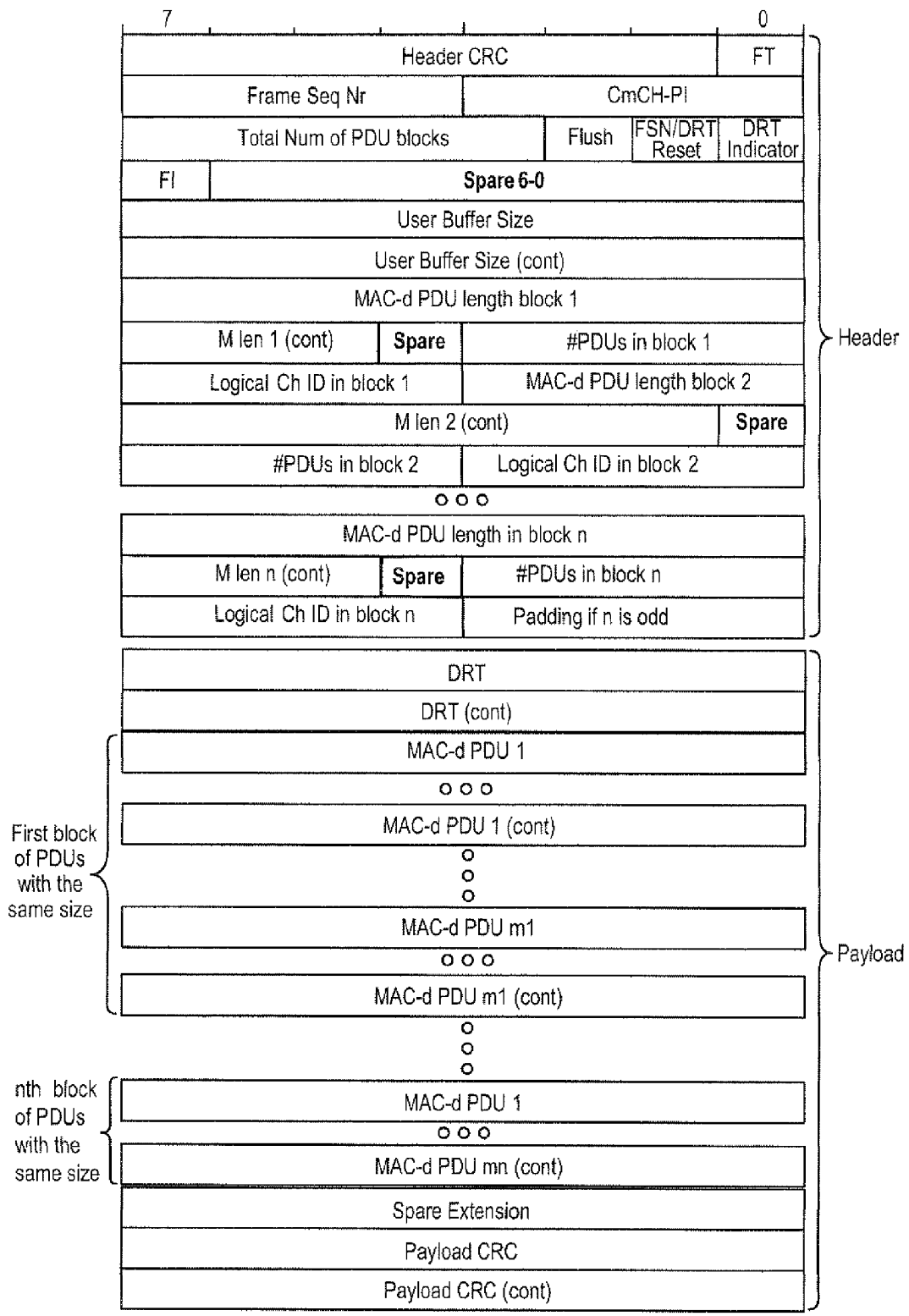
Figure 9:
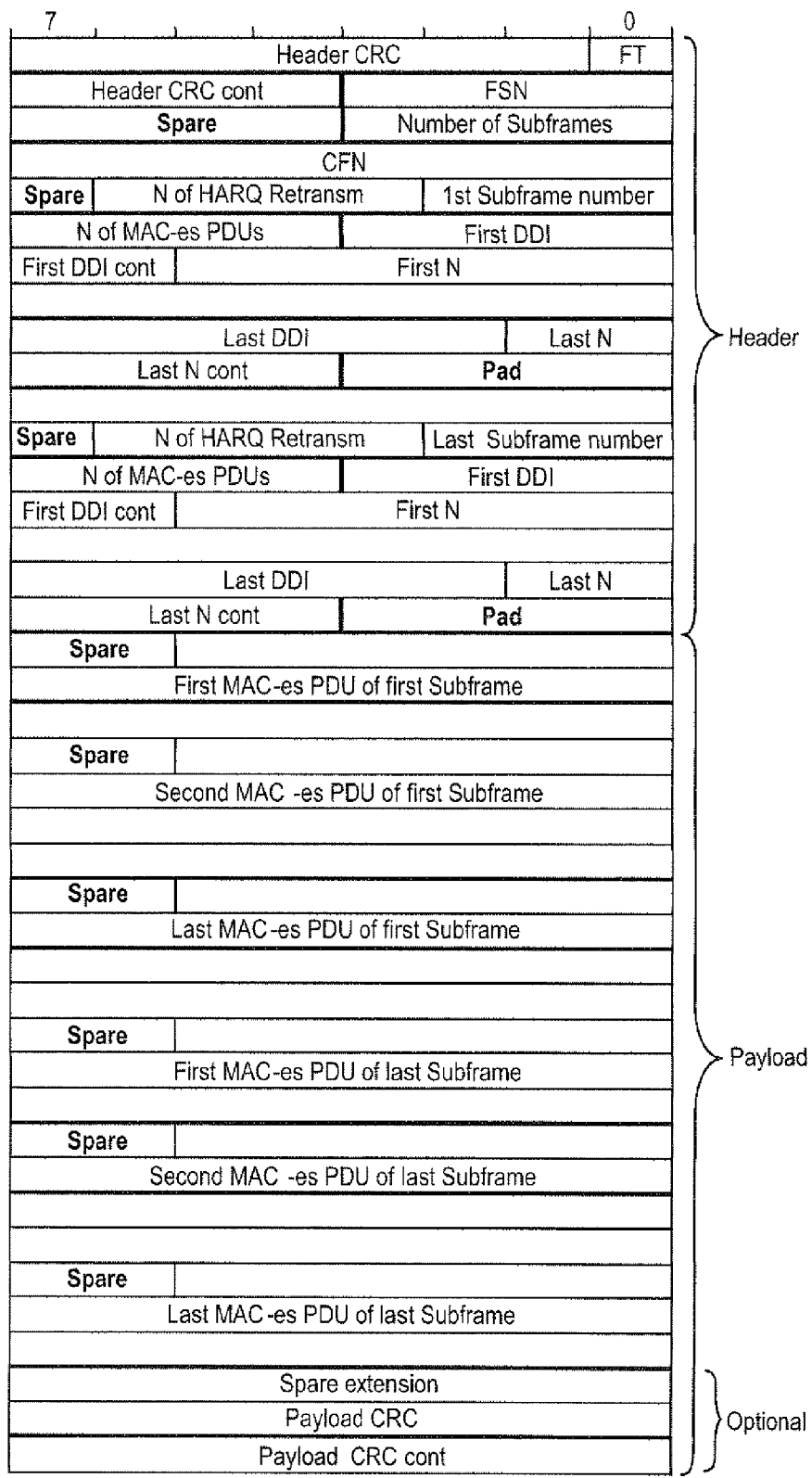
FIG. 9 shows an example E-DCH UL data frame structure.

FIGS. 8A and 8B show example HS-DSCH data frame structures. Both include frame sequence number (FSN) and DRT fields. FIG. 9 shows an example E-DCH UL data frame structure which includes an FSN field. There is no a dedicated field for DRT in EUL, but from FSN and CFN field and the sub frame number the DRT value may be calculated.

Figure 10:
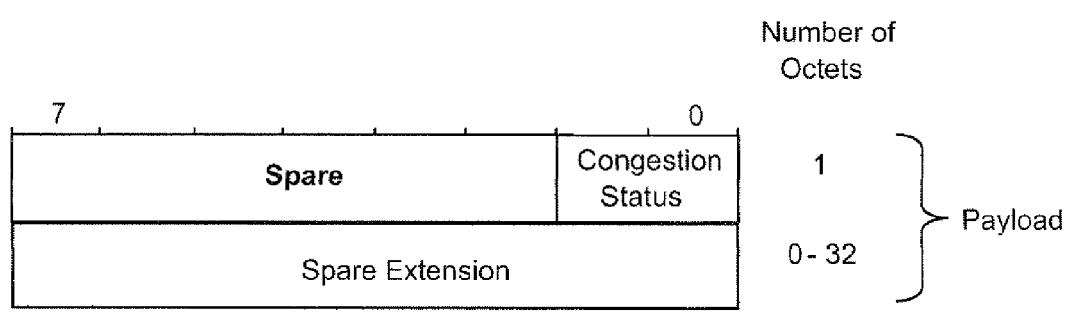
FIG. 10 shows an example TNL congestion indication (TCI) control frame.

FIG. 10 shows an example transport network congestion information (TCI) control frame that carries congestion status information about one or more data packet flows affected by a particular congestion bottleneck in the transport network. The TCI may contain a congestion status field, which can for example indicate for each flow no congestion, congestion due to delay build-up, congestion due to frame loss, etc. The congestion controller in the Node B for the downlink and in the RNC for the uplink may be used to generate and send TCI control frames to bit rate calculation functionalities associated with affected flows as shown in FIG. 7.

It may be useful to generate in the congestion controller a history for each data packet flow to build up a table that contains previous congestion-relevant decisions about those flows. One example of a congestion-relevant decision might be the SRNC previously identified for this flow based on a DRT value. Based on such a table, the most probable SRNC is identified. This additional information permits more robust decision-making. For example, if the last four decisions identified RNC-X as a congestion area for certain flows, and there is some uncertainty for a current decision between RNC-X and RNC-Y based on the current DRT value, then this history can be used to select RNC-X for the current congestion decision. The congestion area may be the same SRNC or the same Node B, but it may also be the same transport network link or parallel transport network links that have the same SRNC and the same Node B. For example, assume there are two physical connections between an RNC and a Node B. In this situation, in addition to the DRT-based bottleneck detection, it is useful to determine one-way delay and/or packet loss pattern for flows. Based on DRT values, it is determined that two flows have the same RNC and Node B and share the same congestion area. But if there is a significant difference in the packet loss pattern or one-way delay for these flows, then it is determined that they are affected by different congestion areas. If the first flow does not experience packet loss and the one-way packet delay is less then a particular value, e.g., 10 ms, and if the second flow experiences considerable packet loss and its one-way packet delay is larger than, e.g., 50 ms, then the decision may be made that the two flows are experiencing congestion at different transport network bottlenecks. Different transport network quality of service (QoS) levels may also be identified in a similar way as with parallel transport network links to identify multiple transport network bottlenecks.

Congestion detection for a particular flow may also be facilitated by grouping of flows having the same RNC and similar queuing delay estimated based on previously-detected DRT values of the flows in the group or a history of DRT values for the group. For example, if the queuing delays within a group are significantly different while their DRT values are similar, then it can be determined that there are parallel transport network links for flows within that group. A group of flows may also be generated based on observing packet loss patterns for different flows. If a group of flows have similar packet loss patterns, then those flows are probably affected by the same bottleneck. Notification of the congestion affecting a group of flows may be limited to just those flows in the group.

In a non-limiting example embodiment, delaying performance of the flow control action for the predetermined delay period occurs whenever congestion is detected in the radio access transport network. In another example embodiment, delaying performance of the flow control action for the predetermined delay period occurs for some but not all of the times when congestion is detected in the radio access transport network.

In another example embodiment, delaying performance of the flow control action for the predetermined delay period occurs only if the detected congestion is a predetermined type of congestion. Moreover, different delay values may be used for different congestion types. For example, congestion types might include hard congestion and soft congestion as described earlier. The predetermined delay period may include a first delay associated with detecting a soft type of congestion and a second, shorter delay associated with detecting a hard type of congestion. Assume for a non-limiting example that a soft congestion delay limit is 40 ms and a hard congestion delay limit is 60 ms. Congestion action might be delayed for 150 ms for the soft congestion but only for 100 ms for the hard congestion.

In another example embodiment, delaying performance of the flow control action for the predetermined delay period occurs only if the monitored data packet flow is associated with a particular service class or user class (e.g., gold, silver, or bronze user classes).

In another non-limiting example embodiment, a maximum delay value actually waited in a recent prior time interval may be determined. If the maximum delay value exceeds the predetermined delay period, then the flow control action initiated for a current congestion detection is performed or a flow control action message is sent without waiting predetermined delay period. Consider a non-limiting example where a maximum delay value for a particular to data packet flow is already determined during a most recent 100 ms interval. If soft congestion is now detected, but the previously determined delay value is significantly larger than the 40 ins delay limit normally used for soft congestion, then no further delay of the flow control action is imposed.

The fair transport network congestion detection and notification technology is described allows fairness in use of limited transport network communication resources by multiple data packet flows that are subject to a congestion bottleneck associated with those resources. Because all or at least most of the affected flows become or are made aware of the congestion situation, their bit rates, for example, can be reduced fairly. This technology is also useful for short buffer cases where the buffer is not large enough for delay based congestion detection. For example, if the delay limit for soft congestion is 40 ins and the buffer is shorter than 40 ms, then soft congestion is not detected. In these short buffer cases, congestion detection may be based on packet loss.

Another advantage of this fair transport network congestion detection and notification technology is that it maintains separation between the Iur and Iub interfaces. If only the Iur interface is congested, then the flows using only the Iub interface will not detect congestion. As a result, the Iur and Iub interfaces are handled correctly in the sense that flows using a common Iub transport network link are not informed about congestion on an Iur transport network link.

The fair transport network congestion detection and notification technology also provides a robust way to identify the RNC of a data packet flow, is relatively easy to implement, can be used for both downlink and uplink HSPA, and does not pose an interoperability problem.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for detection and notification of congestion in a radio access transport network including one or more radio network controllers coupled to one or more radio base stations, comprising:
   monitoring data packet flows, each data packet flow associated with a mobile radio terminal communication and being controlled in the radio access transport network by one or more corresponding flow control entities, for congestion in the radio access transport network;
   detecting congestion in the radio access transport network for one of the monitored data packet flows;
   determining a flow control action in response to the detected congestion; and
   delaying performance of the flow control action for a predetermined delay period.
   wherein if a maximum delay value actually waited for the one data packet flow in a recent prior time interval exceeds the predetermined elay period, then the flow control action is performed or a flow control action message is sent for th one data packet flow without waiting the predetermined delay period.

2. The method in claim 1, wherein the predetermined delay period is varied based on different predetermined delay period values.

3. The method in claim 1, wherein the detected congestion in the radio access transport network is a shared congested communications link in the radio access transport network, a shared congested radio network controller, or a shared congested radio base station.

4. The method in claim 1, wherein the delaying performance of the flow control action for the predetermined delay period occurs only if the detected congestion is one of a set of predetermined types of congestion.

5. The method in claim 1, wherein the delaying performance of the flow control action for the predetermined delay period occurs if the one monitored data packet flow is associated with a particular service class.

6. The method in claim 1, wherein the predetermined delay period includes a first delay associated with detecting a soft type of congestion and a second, shorter delay associated with detecting a hard type of congestion.

7. The method in claim 1, wherein the flow control action includes reducing a bit rate for one of the monitored data packet flows detected to be congested.

8. The method in claim 1 implemented in a downlink direction from a radio network controller to a radio base station or in an uplink direction from the radio base station to radio network controller.

9. The method in claim 1, wherein the method further comprises:
   generating a flow control message in response to the detected congestion;
   if the maximum delay value does not exceed the predetermined delay period, then delaying sending the generated flow control action message for the predetermined delay period; and after waiting the predetermined delay period, sending the generated flow control action message so the one or more of the flow control entities may take flow control action based on the detected congestion.

10. The method in claim 1, wherein the method further comprises:
    generating a flow control action message in response to the detected congestion;
    sending the generated flow control action message; and
    if the maximum delay value does not exceed the predetermined delay period, then waiting the predetermined delay period after the generated flow control action message is received and then performing the flow control action in response to the flow control action message.

11. The method in claim 1, wherein the delaying performance of the flow control action for the predetermined delay period occurs for some but not all of the times when congestion is detected in the radio access transport network.

12. A radio access transport network node for use in a radio access transport network including one or more radio network controllers coupled to one or more radio base stations, comprising electronic circuitry configured to:
    monitor data packet flows, each data packet flow associated with a mobile radio terminal communication and being controlled in the radio access transport network by one or more corresponding flow control entities, for congestion in the radio access transport network;
    detect congestion in the radio access transport network for one of the monitored data packet flows;
    determine a flow control action in response to the detected congestion; and
    delay performance of the flow control action for a predetermined delay period before the flow control action may be performed
    wherein if a maximum delay value actually waited for the one data packet flow in a recent prior time interval exceeds the predetermined delay period, then the electronic circuitry is further configured to perform the flow control action or send a flow control action message for the one data packet flow without waiting the predetermined delay period.

13. The radio access transport network node in claim 12, wherein the predetermined delay period varies based on different predetermined delay period values.

14. The radio access transport network node in claim 12, wherein the detected congestion in the radio access transport network is a shared congested communications link in the radio access transport network, a shared congested radio network controller, or a shared congested radio base station.

15. The radio access transport network node in claim 12, wherein the delay in performance of the flow control action for the predetermined delay period occurs whenever congestion is detected in the radio access transport network.

16. The radio access transport network node in claim 12, wherein the delay in performance of the flow control action for the predetermined delay period occurs if the one monitored data packet flow is associated with a particular service class.

17. The radio access transport network node in claim 12, wherein the predetermined delay period includes a first delay associated with detecting a soft type of congestion and a second, shorter delay associated with detecting a hard type of congestion.

18. The radio access transport network node in claim 12, wherein the flow control action includes reducing a bit rate for the one of the monitored data packet flows detected to be congested.

19. The radio access transport network node in claim 12, wherein the radio access transport network node is a radio base station.

20. The radio access transport network node in claim 12, wherein the radio access transport network node is a radio network controller.

21. A radio communications system that includes the radio access transport network that comprises the radio access transport network node and the mobile radio terminal communicating via the radio access transport network according to claim 12.

22. The radio access transport network node in claim 12, wherein the delay in performance of the flow control action for the predetermined delay period occurs for some but not all of the times when congestion is detected in the radio access transport network.

* * * * *

UNITED STATES PATENT AND TRADEMARK OFFICE
CERTIFICATE OF CORRECTION

PATENT NO.         : 8,619,573 B2
APPLICATION NO.    : 12/730752
DATED              : December 31, 2013
INVENTOR(S)        : Rácz et al.

Page 1 of 2

It is certified that error appears in the above-identified patent and that said Letters Patent is hereby corrected as shown below:

In the Specification

Column 9, Line 21, delete "MAC-c" and insert -- MAC-e --, therefor.

Column 11, Line 27, delete "40 ins" and insert -- 40 ms --, therefor.

Column 11, Line 40, delete "40 ins" and insert -- 40 ms --, therefor.

In the Claims

Column 12, Line 24, in Claim 1, delete "congestion; and" and insert -- congestion; --, therefor.

Column 12, Line 26, in Claim 1, delete "period." and insert -- period; --, therefor.

Column 12, Line 29, in Claim 1, delete "elay" and insert -- delay --, therefor.

Column 12, Line 31, in Claim 1, delete "th one" and insert -- the one --, therefor.

Column 12, Lines 58-59, in Claim 8, delete "to radio" and insert -- to the radio --, therefor.

Column 12, Line 62, in Claim 9, delete "control message" and insert -- control action message --, therefor.

Column 13, Line 3, in Claim 9, delete "take flow" and insert -- take the flow --, therefor.

Signed and Sealed this
Fifteenth Day of July, 2014

Michelle K. Lee
*Deputy Director of the United States Patent and Trademark Office*

Column 13, Lines 34-35, in Claim 12, delete "may be performed" and insert -- is performed; --, therefor.